United States Patent [19]

Cheong

[11] Patent Number: 5,313,526
[45] Date of Patent: May 17, 1994

[54] METHOD FOR DISCONNECTING CHARACTER STRINGS OF A COMPRESSED IMAGE

[75] Inventor: Chan E. Cheong, Seoul, Rep. of Korea

[73] Assignee: Goldstar Co., Ltd., Rep. of Korea

[21] Appl. No.: 815,930

[22] Filed: Dec. 30, 1991

[30] Foreign Application Priority Data

Dec. 29, 1990 [KR] Rep. of Korea .............. 22456/1990

[51] Int. Cl.$^5$ ............................................. G06K 9/34
[52] U.S. Cl. ........................................ 382/9; 382/48; 382/56; 358/462
[58] Field of Search .................. 382/9, 56, 50, 51, 48, 382/41; 358/462, 465, 466, 464; G06K 9/34, 3/36, 9/46, 9/38, 9/20; H04N 1/40, 1/417

[56] References Cited

U.S. PATENT DOCUMENTS

| | | | |
|---|---|---|---|
| 4,411,015 | 10/1983 | Scherl | 382/51 |
| 4,503,556 | 3/1985 | Scherl | 382/48 |
| 4,577,235 | 3/1986 | Kannapell | 382/52 |
| 4,741,046 | 4/1988 | Matsunawa | 382/9 |
| 4,856,074 | 8/1989 | Nagaoka | 382/9 |

Primary Examiner—Yon J. Couso

[57] ABSTRACT

A method for disconnecting character strings from compressed image data comprising the steps of: scanning data blocks representative of the photographic/-graphic data portion to detect the initial and last y-coordinates of the continuous text data portion, accumulating the number of pixel lines representative of the text data portion, and calculating the character string width upon detecting a profile line. Based on the accumulated number of pixel lines representative of the text data portion, a discrimination is made as to whether a character string is connected to the scanned block. When a character string is connected only to one of left and right sides of the data block, the connected character string is disconnected forcedly by creating a new block corresponding to the character string, based on the position information of each text data portion. In accordance with the present invention, it is possible to improve the accuracy in extracting each data portion and thus the reliability in the acknowledgement of the document.

3 Claims, 7 Drawing Sheets

CONNECTED BLOCK

FIG. 3(B)

DISCONNECTED BLOCK

METHOD FOR DISCONNECTING CHARACTER STRINGS OF A COMPRESSED IMAGE

BACKGROUND OF THE INVENTION

1. Field of the Invention

The present invention relates to a method for dividing a compressed document image into text and graphic data portions in extracting the portions from the compressed document image, for acknowledging the document, and more particularly to a method of forcedly disconnecting the connected photographic/graphic and text data portions constituting a compressed document image data, in extracting each data portion from the compressed document image data, for the acknowledgement of the document, thereby improving the accuracy in extracting each data portion and thus the reliability in the acknowledgement of the document.

2. Description of the Prior Art

For the purpose of shortening the processing time required to divide the document image data into data portions, for the acknowledgement of the document, the document image data is often subjected to data compression. Upon the acknowledgement, the compressed document image data is divided into data portions. The document image data includes two different types of data portions, that is, text type data portions and photographic/graphic type data portions. Generally, a document is composed by arranging the photographic/graphic data portions at the left side or the right side of the document and the text portions at the remaining side. Upon compressing the document image data in this case, adjacent photographic/graphic and text data portions may be connected, if the gap, that is, the space defined between adjacent photographic/graphic and text data portions has a size smaller than the compression rate, that is, insufficient to be still maintained as a space portion after the data compression. As a result, an error may occur in the acknowledgement of the document.

SUMMARY OF THE INVENTION

Therefore, an object of the invention is to provide a method for forcedly disconnecting the connected photographic/graphic and text data portions constituting a compressed document image data, in extracting each data portion from the compressed document image data, for the acknowledgement of the document, thereby improving the accuracy in extracting each data portion and thus the reliability in the acknowledgement of the document.

In accordance with the present invention, this object of the invention can be accomplished by providing a method for disconnecting character strings from compressed image data comprising the steps of: (S1) scanning sequentially all image data blocks created by a division of the compressed image data into photographic/graphic and text data portions and detecting data blocks representative of the photographic/graphic data portion; (S2) retrieving the left side of the data block detected as the photographic/graphic data portion in the step (S1) and discriminating whether at least one character string of the text data portion is connected to the left side of the data block (L←T) or not (L←F); (S3) retrieving the right side of the data block detected as the photographic/graphic data portion in the step (S1) and discriminating whether at least one character string is connected to the right side of the data block (R←T) or not (R←F); (S4) performing a feedback to the step (S1) if it is discriminated at the steps (S2) and (S3) that character strings are connected to both the left side and the right side of the data block (L,R←T), or that any character string is connected to neither the left side or the right side of the data block (L,R←F); and (S5) if it is discriminated at the steps (S2) and (S3) that at least one character string is connected only to one of left and right sides of the data block, disconnecting the data block into independent data portions by utilizing character string position information extracted upon the retrieval of the character string connected to the data block and then performing a feedback to the step (S1).

BRIEF DESCRIPTION OF THE DRAWINGS

Other object and aspects of the invention will become apparent from the following description of embodiments with reference to the accompanying drawings in which.

DESCRIPTION OF THE PREFERRED EMBODIMENTS

Figure 1:
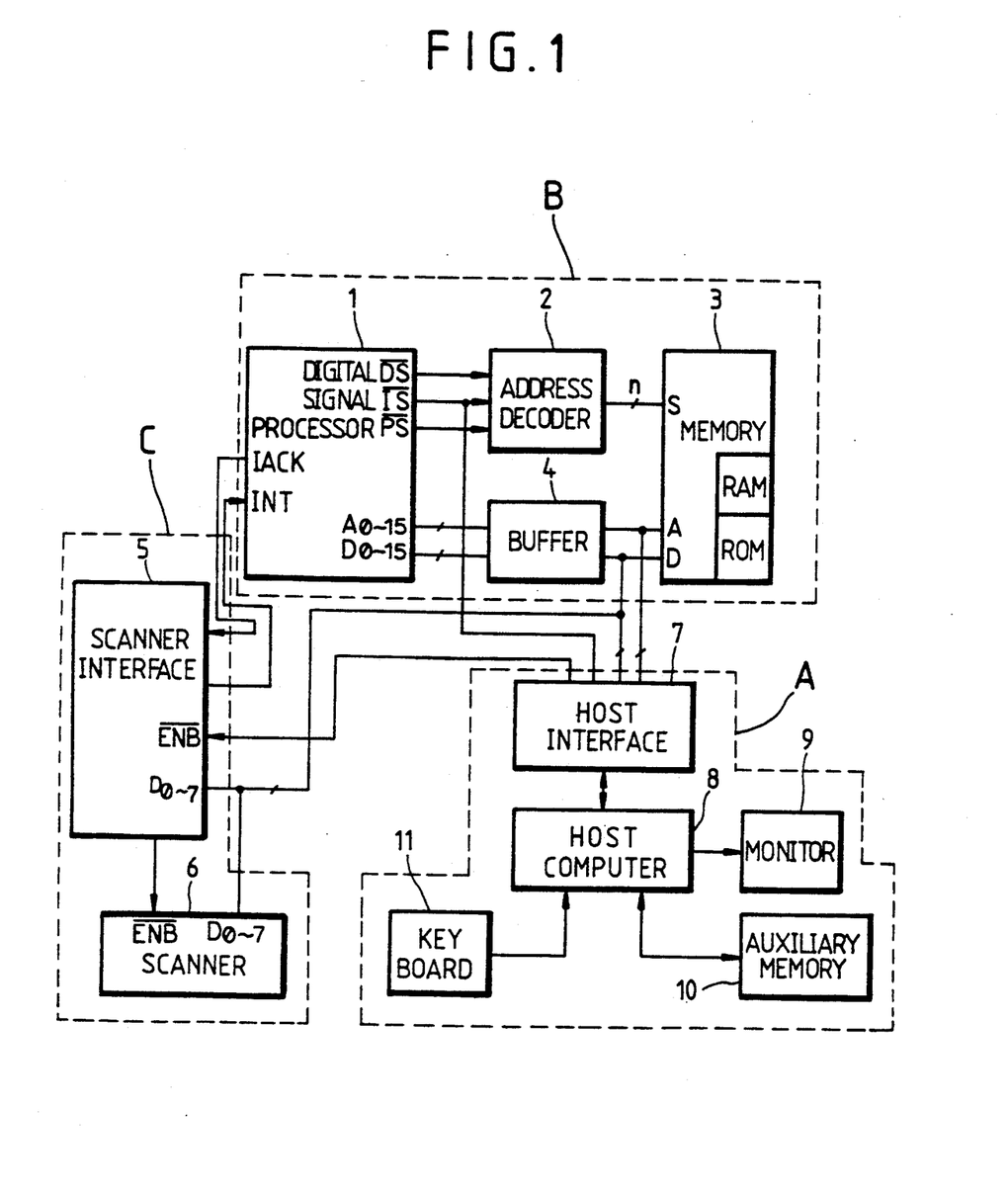
FIG. 1 is a block diagram illustrating a general document acknowledgement system.

Referring to FIG. 1, there is shown a document acknowledgement processing system to which the present invention is applied. As shown in FIG. 1, the system comprises a general purpose computer section A including a host interface 7, a host computer 8, a monitor 9, an auxiliary memory 10 and a key board 11, to process a document acknowledgement, a dedicated hardware section B including a digital signal processing unit (DSP) 1, an address decoder 2, a memory 3 and a buffer 4, to process an image compression and a data portion division for the document acknowledgement under the control of the general purpose computer A, and a document image input section C including a scanner 6 and a scanner interface 5, to transmit document image data to the general purpose section A and the dedicated hardware section B under the control of the general purpose section A.

In FIG. 1, the reference numeral "DS" designates a data selection signal, "IS" an input/output selection signal, "PS" a program selection signal, "INT" an interrupt signal, "IACK" an interrupt acknowledgement signal, "ENB" is an enable signal, "AD" is address, "D" data, and "S" a selection signal.

A method for disconnecting character strings from a compressed image by utilizing the document acknowledgement system in accordance with the present invention will now be described in detail.

Figure 2:
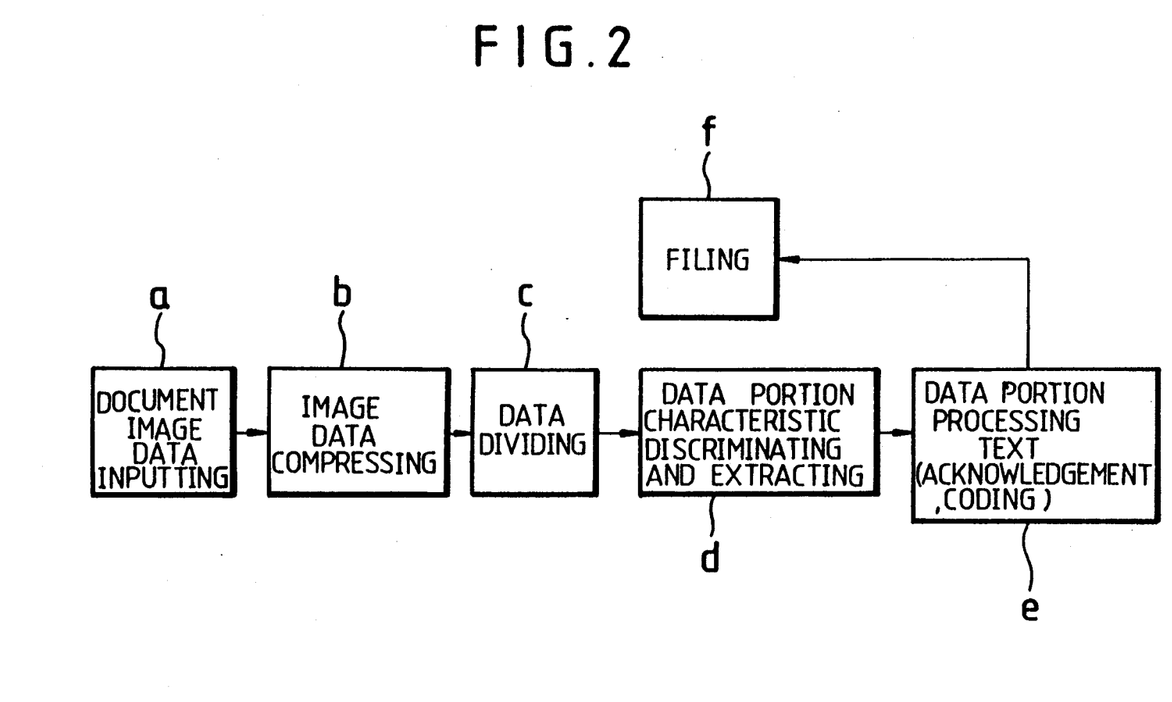
FIG. 2 is a flowchart of a document acknowledgement process performed by the system of FIG. 1.

FIG. 2 is a flowchart of a document acknowledgement process performed by the system of FIG. 1. As shown in FIG. 2, the host computer 8 of the general purpose computer A enables the digital signal processing unit 1 and the scanner interface 5, via the host interface 7, upon receiving a command via the keyboard 11. Accordingly, the scanner 6 operates to input a document image to the system, via the scanner interface 5, as shown in the block a of FIG. 2. The image data of the inputted document, D0 to D7, are stored in the memory 3 and then sent to the digital signal processing unit 1, via the buffer 4 so that it is subjected to an image compression, as shown in block b in FIG. 2, and the compressed image data proceed to be divided into unconnected individual data portions, as shown in block C in FIG. 2. Thereafter, the individual data portions, namely the unconnected blocks are then identified as either text data or photographic/graphic data, as shown in block d in FIG. 2. But, there are text data portions, in other words, character strings that are connected to photographic/graphic data portion due to the excessive compression of the image. As a result, these character strings are recognized as a portion of photographic/graphic data. These character strings are forced to be separated from the photographic/graphic data portion as shown in block e in FIG. 2. Finally, text portions of the compressed image data are subjected to a text acknowledgement, while photographic/graphic data portions of the image data are subjected to a coding process, as shown in block f of FIG. 2.

Figure 3A:
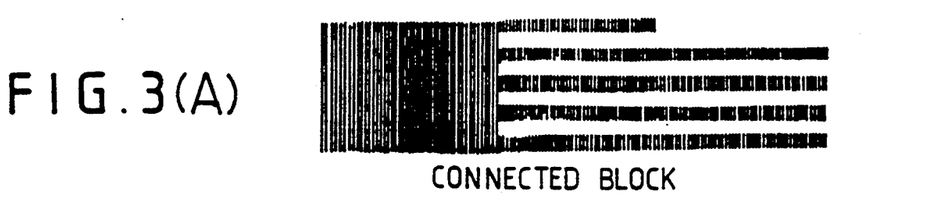
FIGS. 3A and 3B are schematic views illustrating types of the connection and the disconnection of character strings of a compressed image data, respectively.
Figure 3B:
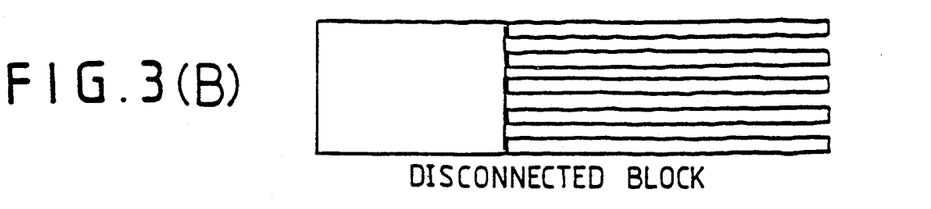

Referring to FIGS. 3A and 3B, there is illustrated types of the connection and the disconnection of character strings of a compressed image data, for explaining the principle of the present invention. FIG. 3A shows an example of the case where the photographic/graphic data portion and the text portion including several character strings are connected with each other, since the space between the photographic/graphic portion and the text portion has a size smaller than the compression rate. Thereby the portions are prevented from being disconnected from each other, in extracting each portion of the image data. On the other hand, FIG. 3B shows an example of the case wherein the right character strings are forcedly disconnected from the photographic/graphic data portion.

In accordance with the present invention, the compressed image data in which the left photographic/graphic data portion and the right text portion including character strings are connected with each other is subjected to a process of extracting and discriminating the characteristic of each data portion (the block d in FIG. 2). Thereafter, as the compressed image data is subjected to a process of disconnecting the data portions from each other (the block e in FIG. 2), the right text data portion can be disconnected from the left photographic/graphic data portion, as shown in FIG. 3B.

Figure 4A:
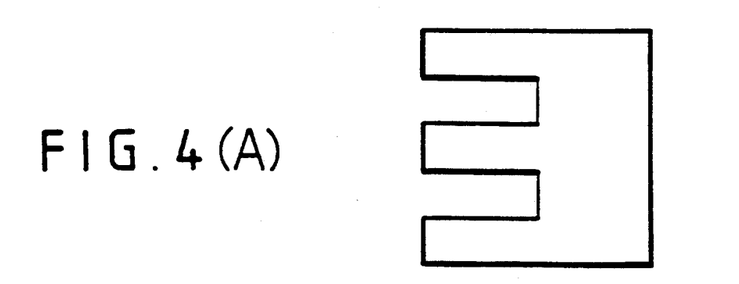
FIGS. 4A and 4B are schematic views explaining types of the connection of character strings.
Figure 4B:
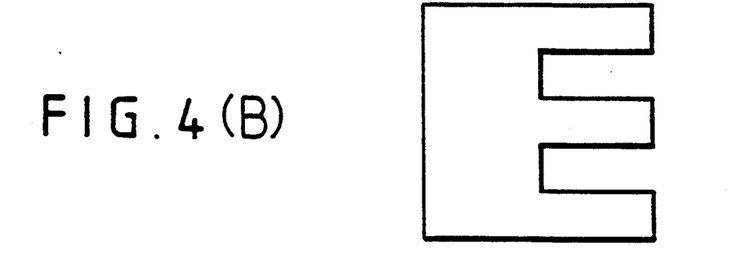

FIGS. 4A and 4B are schematic views explaining types of the connection of character strings. FIG. 4A shows a connection type wherein the character strings are connected to the left edge of the photographic/graphic data portion. On the other hand, FIG. 4B shows a connection type wherein the character strings are connected to the right edge of the photographic/graphic data portion. Since there are two types in the connection of the character strings to the photographic/graphic data portion, it is necessary to check the profile type of the photographic/graphic data portion and discriminate the connection type on the basis of the checked result, prior to the forced disconnection.

Figure 5A:
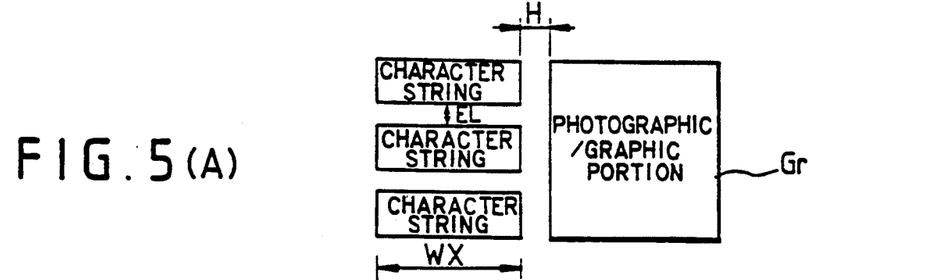
FIGS. 5A through 5E are schematic views explaining a method for disconnecting the character strings from the photographic/graphic data portion of image data in accordance with the present invention.
Figure 5B:
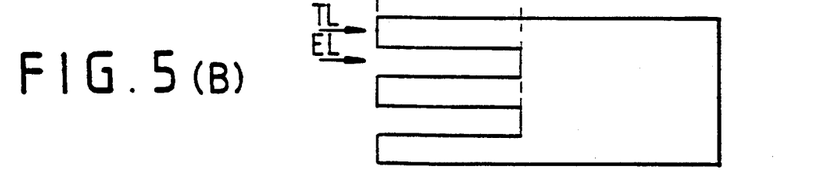
Figure 5C:
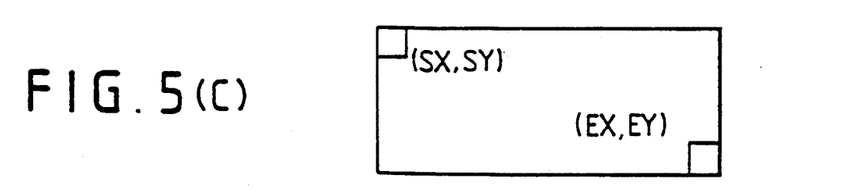

Referring to FIGS. 5A and 5B, there is shown schematic views explaining a method for disconnecting the character strings from the photographic/graphic data portion of image data. FIG. 5A shows the case wherein a text portion TL including character strings is arranged at the left edge of a photographic/graphic data portion Gr such that a space portion is defined between the data portions TL and Gr. If the size H of the space portion is smaller than that of the space portion EL defined between adjacent character strings in the text data portion TL, the data portions TL and Gr are connected with each other upon the compression of image data. Upon extracting each data portion of the compressed image data, accordingly, the photographic/graphic data portion Gr is extracted in the form of a photographic/graphic data block which includes the photographic/graphic data portion Gr and the text data portion TL connected to the left side of the photographic/graphic data portion Gr, as shown in FIG. 5B.

That is, as inputted document image data is subjected to an image compression, a division into data portions and then an extraction of each data portion, a photographic/graphic data block shown in FIG. 5B is extracted in which both the photographic/graphic data portion Gr and the text data portion TL are presented.

Accordingly, such photographic/graphic data block which includes the photographic/graphic data portion Gr and the text data portion TL connected to the left side or the right side of the photographic/graphic data portion Gr is subjected to a process of forcedly disconnecting the character strings from the photographic/graphic data portion Gr, in accordance with the present invention.

In accordance with the present invention, the process of forcedly disconnecting the character strings from the photographic/graphic data portion Gr of compressed image data comprises a step (S1) of scanning sequentially all image data blocks created by a division of compressed image data into photographic/graphic and text data portions and detecting data blocks representative of the photographic/graphic data portion, a step (S2) of retrieving the left side of the data block detected as the photographic/graphic data portion in the step (S1) and discriminating whether at least one character string of the text data portion is connected to the left side of the data block (L←T) or not (L←F), a step (S3) of retrieving the right side of the data block detected as the photographic/graphic data portion in the step (S1) and discriminating whether at least one character string is connected to the right side of the data block (R←T) or not (R←F), a step (S4) of performing a feedback to the step (S1) if it is discriminated at the steps (S2) and (S3) that character strings are connected to both the left side and the right side of the data block (L,R←T), or that any character string is connected to neither the left side or the right side of the data block (L,R←F), a step (S5) of, if it is discriminated at the steps (S2) and (S3) that at least one character string is connected only to one of left and right sides of the data block, disconnecting the data block into independent data portions by utilizing character string position information extracted upon the retrieval of the character string connected to the data block and then performing a feedback to the step (S1), so that the character string is forcedly disconnected from the data block, thereby enabling the data block to be processed as correct image data portions.

Figure 6:
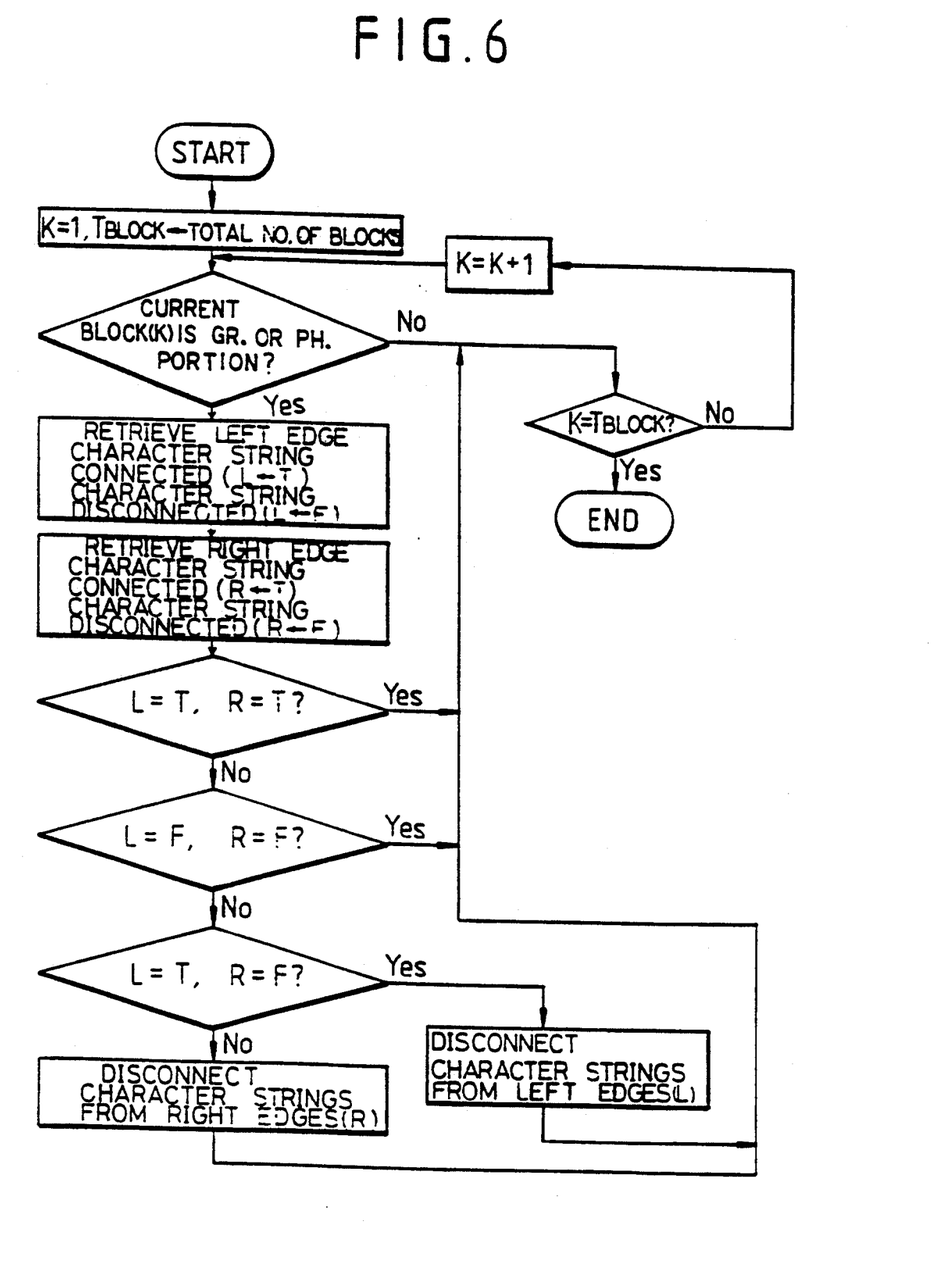
FIG. 6 is a flowchart of the character string disconnection method according to the present invention.

FIG. 6 is a flowchart of the character string disconnection method according to the present invention. First, the total number $T_{BLOCK}$ of data blocks divided from compressed document image data in the form of image data portions is set, as shown in FIG. 6. Thereafter, a discrimination is made as to whether the data block K to be currently processed (K=1) corresponds to the photographic/graphic data portion. This retrieval is repeated by selecting data blocks sequentially (K=K+1) until the number of retrieved data blocks corresponds to the total number $T_{BLOCK}$ of data blocks.

Thereafter, it is discriminated whether the currently processed data block corresponds to the photographic/graphic data portion which includes only a normal photographic/graphic data portion or which includes both a photographic/graphic data portion and at least one character strings connected to the left side or the right side of the photographic/graphic data portion. If the data block corresponds to the photographic/graphic data portion to which the character string is connected, it is subjected to a process of disconnecting the character string from the photographic/graphic data portion. The discrimination of each data block corresponding to the photographic/graphic data portion to which the text data portion is connected is accomplished by checking profiles of the left side and the right side of the data block.

That is, if the currently retrieved data block K corresponds to the photographic/graphic data portion, the left side thereof is retrieved and then the right side thereof is retrieved, so as to discriminate the type of data block that the text data portion is connected to the left side or the right side thereof, as shown in FIG. 4.

If the data block is of the type that the text data portion is connected to the left side or the right side thereof, a flag is set [L←T ($FLAG_L$←TRUE) or R←T ($FLAG_R$←TRUE)]. However, when the data block is of the type that any character string is connected to neither the left side nor the right side thereof, it is discriminated as a normal photographic/graphic data portion. In this case, the flag is set again [L←T ($FLAG_L$←FALSE) or R←T ($FLAG_R$←FALSE)].

At this time, disregarded is the processing of the types of data blocks that the text data portion is connected to either of the left side or the right side thereof or that any character string is connected to neither of the left side nor the right side thereof. Thereafter, the processing of next data block (K=K+1) is carried out. When the data block is of the type that the character string is connected only to one of the left side or the right side thereof [(L=T, R=F) or (L=F, R=T)], the connected character string is forcedly disconnected from the side of data block, on the basis of position information of the text data portion extracted upon the retrieval of left and right sides of the data block. Subsequently, the processing of the next data block (K=K+1) is carried out.

The discrimination of the type of data block that the character string is connected to the left side or the right side thereof is carried out, as follows: First, a rectangular region is defined by the coordinate (SX, SY) and the coordinate (EX, EY) corresponding to the left upper corner and the right lower corner of the subject data block, respectively. Upon the retrieval of the left side of the data block, the region is checked from left to right and from top to bottom, by utilizing a raster form.

Figure 7:
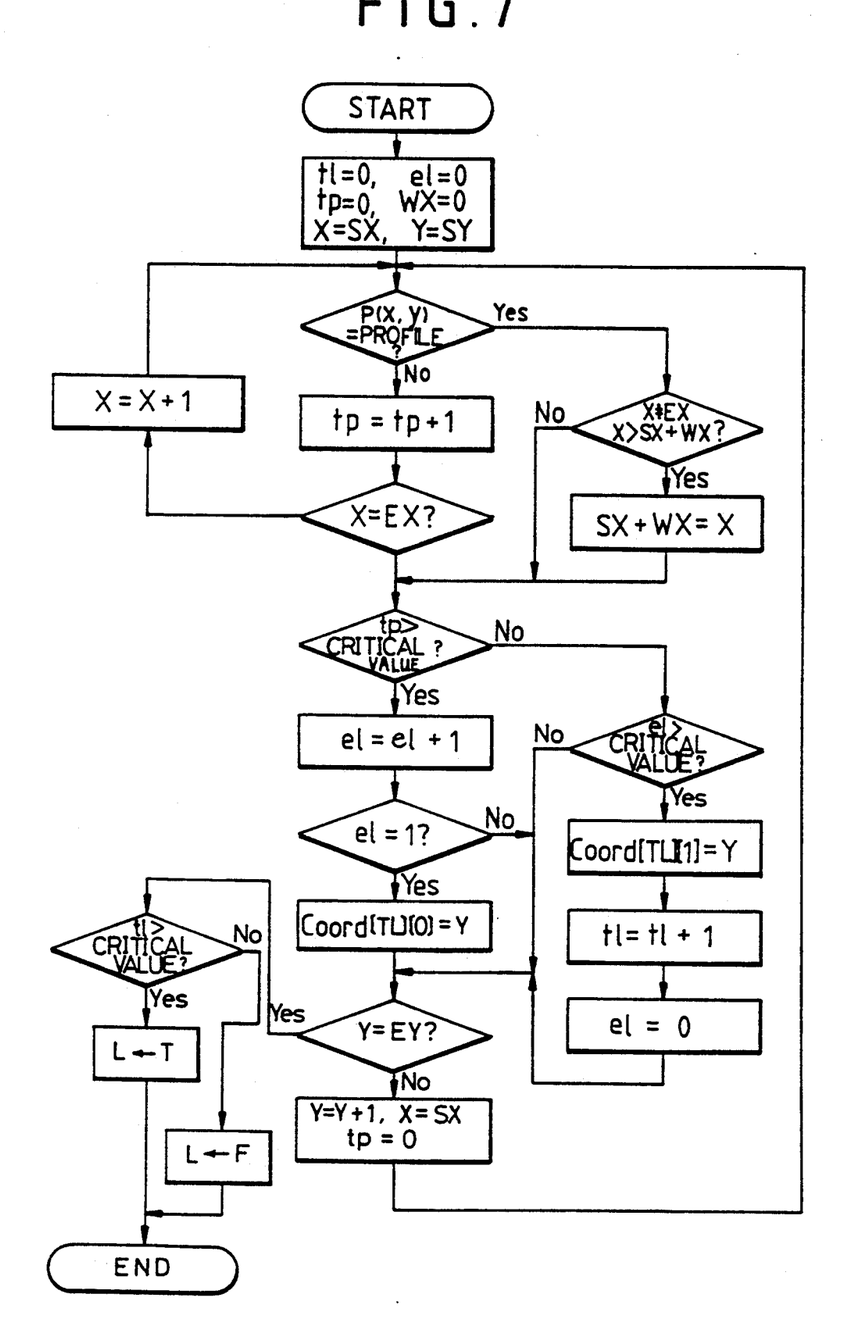
FIG. 7 is a flowchart of the process of controlling the retrieval of the left side of data block described in conjunction with FIG. 6.

FIG. 7 is a flowchart of the process of controlling the retrieval of the left side of data block described in conjunction with FIG. 6. First, the initialization of the number t1 of pixel lines representative of the text data portion TL, the number tp of accumulated white pixels TP in one pixel line of the text data portion TL, the number el of space portions EL defined among character strings, the width WX of each character string and the maximum value of the x-coordinate are performed. Thereafter, the coordinate (SX, SY) of the left upper corner of the data block which has been discriminated as the photographic/graphic data portion is set for the x-coordinate X and the y-coordinate Y of a x-y coordinate system (X=SX, Y=SY). The data block is then retrieved from left to right and from top to bottom, by the pixel.

The extraction of each data portion from a document image data can be accomplished by utilizing a conventional method disclosed in Korean Patent Application No. 89-17630 filed in the name of the applicant. According to the method, the value of pixels corresponding to the profile of each data portion is set to "2". Accordingly, it is possible to extract correctly each data portion, by detecting the value of pixels which is "2".

That is, the data block is scanned from left to right, until the pixel having the value of 2 is detected. The scanned pixel value [P(X,Y)] which is not the profile value of 2, but the character value of 1, is disregarded. When the space pixel value "0" representative of the space pixel is detected, the number TP of space pixels is accumulated (TP=TP+1). The scanning of the profile pixels is continued until the x-coordinate X reaches the last, maximum value EX (X=EX). If the x-coordinate X is not the maximum value EX, it is accumulated (X=X+1).

If the profile pixel is detected, it is necessary to find the distance of the detected profile pixel from the initial x-coordinate SX of the data block. This is because the width of each character string connected to the left side of the data block should be determined, upon disconnecting the character string.

Figure 5D:
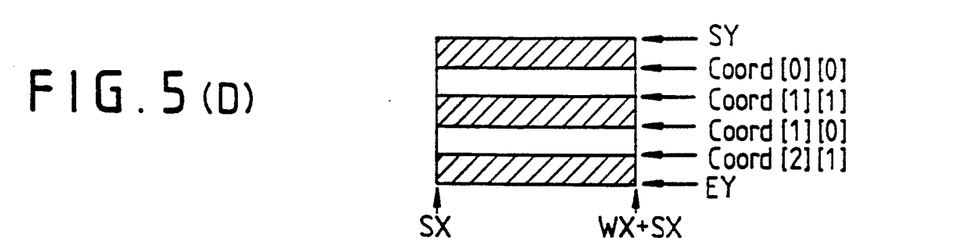

That is, the width is determined on the basis of the x-coordinate of the profile pixel detected at the position being away from the initial x-coordinate SX at the maximum. In FIGS. 5B and 5D, the width has the value of WX. Herein, the x-coordinate has the value of SX+WX. Since other profile pixels may be detected as the y-coordinate increases, the width WX should be compared with the width of each newly detected profile pixel measured from the initial x-coordinate, so as to set the width WX to the larger value.

In case that the x-coordinate X of the pixel currently detected as the profile pixel having the profile value of 2 is discriminated as being the last value EX (X=EX) or that the x-coordinate X of the currently detected pixel is smaller than the x-coordinate of the just previous profile pixel, that is, the current width of the character string is smaller than the set maximum width WX, the set width WX is still maintained. On the other hand, if the x-coordinate X of the current profile pixel is the last value EX (X=EX) or if the x-coordinate X of the current profile pixel is larger than the x-coordinate SX+WX of the just previous profile pixel, that is, the current width is larger than the set width WX (X>SX+WX), the x-coordinate X of the current profile pixel is set for the x-coordinate SX+WX to set a new maximum width WX (X=SX+WX) based on the x-coordinate X.

If the x-coordinate has reached the final value or the maximum width WX has been fixed, a discrimination is then made as to whether the pixel line to be disconnected from the photographic/graphic data portion is the text data portion or the space data portion. The vertical space between adjacent character strings in a document has a substantially constant characteristic, so that the space portions EL defined between adjacent character strings are substantially constant. Accordingly, a determination should be made as to whether the currently scanned pixel line is the text data portion TL or the space portion EL. When the accumulated number tp of white pixels TP having the pixel value of "0" in the pixel line is more than a predetermined critical value (tp>critical value), the pixel line is discriminated as a space portion EL.

On the other hand, upon disconnecting forcedly the character strings from a data block, the y-direction position information of each character string is needed, in addition to the x-direction width WX of each character string. That is, the initial y-coordinate and the last y-coordinate of each character string are needed, as shown in FIG. 5D. Accordingly, when a first space portion EL is detected (el=1), the y-coordinate of the first space portion EL is designated as the last y-coordinate of the text data portion TL which has been detected just before the detection of the first space portion EL. On the other hand, the initial y-coordinate of the text data portion TL is designated by the y-coordinate of every newly detected text data portion TL. The designated x-coordinate and y-coordinate are stored in a two dimensional array Coord[TL][1].

Accordingly, the currently accumulated number tp of white pixels TP in the currently scanned pixel line is more than the critical value, the pixel line is discriminated as a space portion EL and the number el of the space portions EL is incremented by one (el=el+1). Subsequently, a discrimination is made as to whether the currently detected space portion EL is the first space portion, that is, whether the number el of the detected space portions EL is one (el=1). If the current space portion EL is the first space portion, the y-coordinate of the space portion EL is stored in a two dimensional array Coord [TL][0] as the last y-coordinate of the character string portion TL which has been detected just before the detection of the first space portion EL (Coord [TL][0]=Y).

In cases that the current space portion EL has not been discriminated as the first space portion or that the last y-coordinate of the first text data portion TL has been stored, a discrimination is made as to whether the y-coordinate is the last coordinate EY (Y=EY).

On the other hand, if the accumulated number tp of white pixels TP having the pixel value of "0" in the currently scanned pixel line is no more than a predetermined critical value (tp≦critical value), the pixel line is discriminated as a pixel line included in a character string, that is, a text data portion TL. Thereafter, the accumulated number el of the detected space portions EL is compared with a predetermined critical value. Thereafter, a discrimination is made as to how many pixel lines representative of the space portions have been continuously detected. If the accumulated number is more than the critical value, it is determined that a space portion EL has been detected. When the accumulated number el is no more than the critical value, it is disregarded.

That is, when the pixel line has been discriminated as the text data portion TL, a discrimination is made as to whether the number el of the space portions EL which has been detected is more than a predetermined critical value (el>critical value). If the number el of the detected space portions EL is no more than the predetermined critical value, the procedure proceeds to the step to discriminate whether the y-coordinate of the text data portion TL is the last coordinate EY (Y=EY). On the other hand, when the number el of the detected space portions EL is more than the predetermined critical value, the initial y-coordinate of the text data portion TL is stored in the two dimensional array Coord [TL][1], as a new y-coordinate of the text data portion TL. Subsequently, the number tl of pixel lines detected as the text data portion TL is incremented by one (tl=tl+1). The number el of pixel lines representative of the space portion EL is then initialized (el=0), and the procedure proceeds to the step to discriminate whether the y-coordinate of the text data portion TL is the last coordinate EY (Y=EY).

If the y-coordinate of the text data portion TL has not been discriminated as the last coordinate EY, the value of the y-coordinate is incremented by one (Y=Y+1) and the x-coordinate is set for the initial x-coordinate SX (X=SX). Thereafter, the number of white pixels TP is initialized (tp=0) and the retrieval of a next pixel line is performed.

In the above-mentioned manner, the retrieval of the entire data block proceeds from left to right and from top to bottom of the data block until the y-coordinate of the right lower end of the data block corresponds to the last y-coordinate EY (Y=EY). Upon detecting the y-coordinate of the right lower end of the data block corresponding to the last y-coordinate EY, the retrieval of the entire data block is completed. Thereafter, a comparison is made as to whether the number tl of pixel lines detected as the text data portion TL is more than a predetermined critical value, so as to discriminate whether at least one character string and at least one space portion has been connected to the left edge of a photographic/graphic data portion. If the number tl of pixel lines detected as the text data portion TL is more than the predetermined critical value, it is set that at least one character string is connected to the left side of the data block (L←T). On the other hand, if the number tl of pixel lines detected as the detected text data portion TL is no more than the predetermined critical value, it is set that no character string is connected to the left side of the data block (L←F).

On the other hand, the step (S3) of retrieving the right side of the data block detected as the photographic/graphic data portion in the step (S1) is performed according to the same procedure as in the step (S2) of retrieving the left side of the data block, except for the procedure of detecting the width WX of each character string. In this case, the width WX of each character string is detected by selecting the x-coordinate of each detected profile pixel as the minimum value of x-coordinate.

Based on the flag which was set according to the retrieval of the character string connection type at the left side or the right side of data block, a discrimination is made as to whether the character string is connected to the left side or the right side of data block [(L=T, R=F) or (L=F, R=T)]. Thereafter, a forced disconnection of the character string from the left side or the right side of data block is performed based on the discriminated character string connection type. At this time, disregarded is the processing of the types of data blocks that the character string is connected to either of the left side of the right side thereof (L=T, R=T) or that the character string is connected to neither of the left side nor the right side thereof (L=F, R=F).

In the type that at least one character string is connected to the left side of data block (L=T, R=F), new data blocks are made, by utilizing the position information extracted in the procedure of retrieving the left side of the retrieved data block, that is the width WX of the retrieved character string, the initial y-coordinate and the last y-coordinate.

FIG. 5D illustrates the extracted data portion upon the retrieval of the left side of data block, which corresponds to the character string portion forcedly disconnected from the data block illustrated in FIG. 5B.

Figure 8:
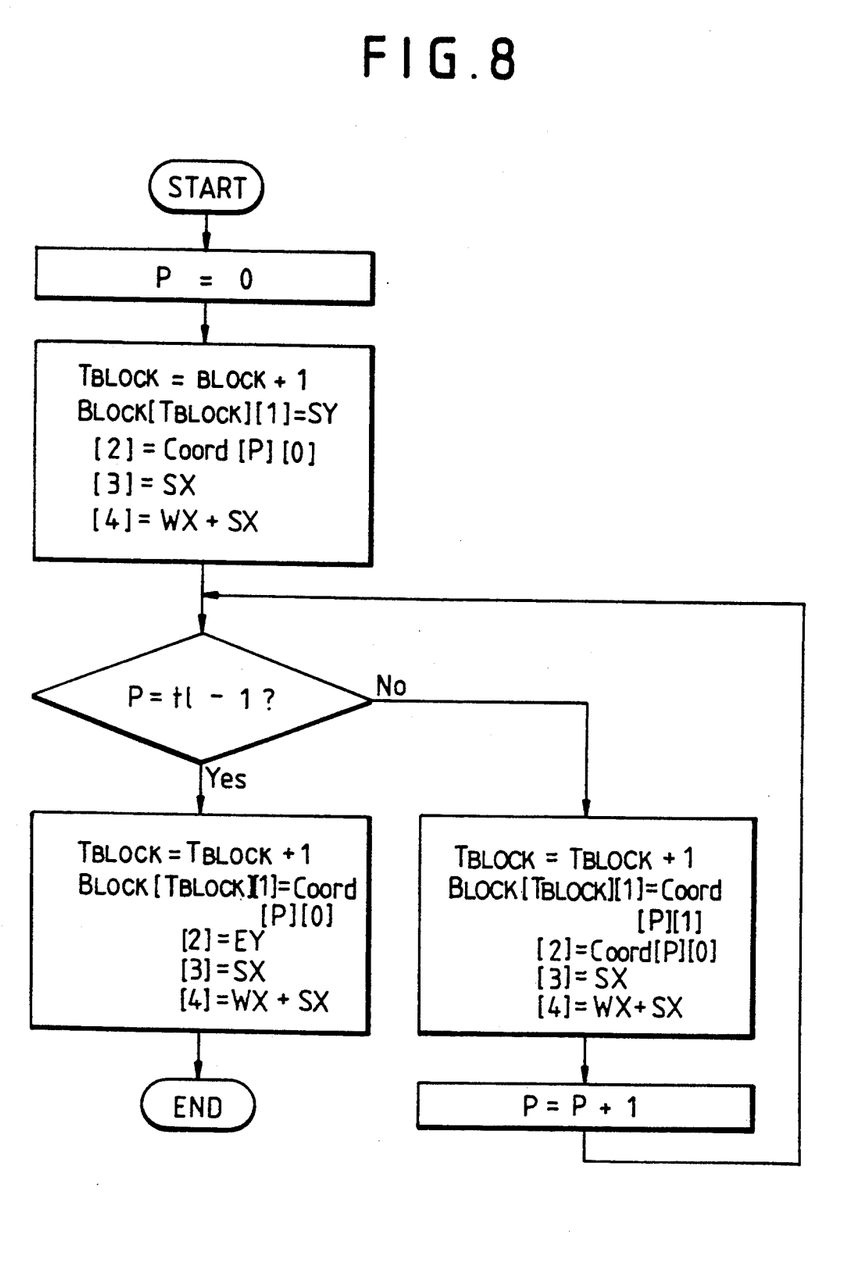
FIG. 8 is a flowchart of a control procedure of disconnecting the character strings from the data block.

Referring to FIG. 8, there is shown a flowchart of a control procedure of disconnecting the character strings from the data block. First, the number P of character strings of the connected text portion TL to be established as corresponding data blocks is initialized (P=0). Then, the current total number $T_{BLOCK}$ of data blocks is incremented by one ($T_{BLOCK}=T_{BLOCK}+1$). Respective position coordinates of the new data block is set for the coordinates detected in the previous procedures. The position coordinates are of two dimensional array type.

The setting of position coordinates will now be described in detail, in conjunction with FIG. 5D.

In the case illustrated in FIG. 5D, the number of character strings data portions TL is three. The initial y-coordinate of the first text data portion TL is SY, while the last y-coordinate is the value Coord[0][0] stored in the previous procedures.

Herein, "Coord" means the two dimensional array, the numeral "0" in the first bracket the first character string of the text data portion TL, and the second bracket the y-coordinate of the text data portion TL. The numeral "0" in the second bracket means the last y-coordinate of the text data portion TL, while the numeral "1" the initial y-coordinate of the text data portion TL.

Accordingly, Coord[0][0] means the last y-coordinate of the first character string of the text data portion TL, Coord[1][1] the initial y-coordinate of the second character string of the text data portion TL, Coord[1][0] the last y-coordinate of the second character string of the text data portion TL, and Coord[2][1] the initial y-coordinate of the third character string of the text data portion TL. Also, EY designates the last y-coordinate of the last, third character string of the text data portion TL, while WX+SX the x-coordinate of the text data portion TL.

After the increment of the total data block number by one ($T_{BLOCK}=T_{BLOCK}+1$), the new data block is set for the position information of the first character string of the text data portion TL, so as to form an independent data block.

That is, the setting of the data block is carried out as follows:

$$BLOCK[T_{BLOCK}] \ [1] = SY$$
$$[2] = Coord[P][0]$$
$$[3] = SX$$
$$[4] = WX + SX$$

Herein, [$T_{BLOCK}$] means the new data block established by the increment of the total data block number, [1] the initial y-coordinate of the data block, that is the initial y-coordinate of the first character string in the text data portion TL, [2] the last y-coordinate of the data block, that is the last y-coordinate Coord[P][0] of the first character string in the text data portion TL (herein, P is 0, since the data block corresponds to the first character string), [3] the initial x-coordinate SX of the data block, and [4] the last x-coordinate WX+SX of the data block.

After the establishment of the new independent data block corresponding to the first string by setting the initial y-coordinate, the last y-coordinate, the initial x-coordinate and the last x-coordinate of the first character string (tl=0), a discrimination is made as to whether the character string corresponding to the established data block is the last one (P=tl−1) (herein, the last value of tl is tl−1, because the first value of tl is 0). If the character string is not the last one, the address number of data blocks is incremented by one ($T_{BLOCK}=T_{BLOCK}+1$). Thereafter, the position information of a new data block is set as follows:

$$BLOCK[T_{BLOCK}] \ [1] = Coord[P][1]$$
$$[2] = Coord[P][0]$$
$$[3] = SX$$
$$[4] = WX + SX$$

Herein, Coord[P][1] means the initial y-coordinate of the character string P-th in the text data portion TL, while Coord[P][0] the last y-coordinate of the data block, that is the last y-coordinate Coord[P][0] of the P-th character string in the text data portion TL.

The number P of character strings currently established as data blocks is then incremented by one (P=P+1), so as to establish a data block corresponding to the next character string.

The above procedures are repeated until the last character string is detected (P=tl−1), so as to create independent data blocks corresponding to all character strings of the text data portion TL. When the last character string is detected, the number of the address number of data blocks is incremented by one ($T_{BLOCK}=T_{BLOCK}+1$). Thereafter, the position information of the last block is set as follows:

$$BLOCK[T_{BLOCK}] \ [1] = Coord[P][1]$$
$$[2] = EY$$
$$[3] = SX$$
$$[4] = WX + SX$$

Figure 5E:
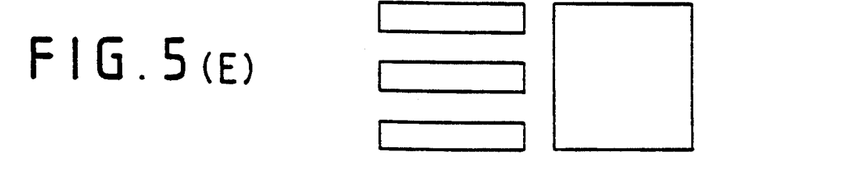

On the other hand, the disconnection of character strings from the right side of the retrieved data block can be accomplished in the same manner as in FIG. 8, by creating data blocks corresponding to the character strings connected to the retrieved data block by using position information of the character strings extracted in the procedure of retrieving the right side of the retrieved data block. Thus, the character strings can be disconnected as independent data blocks from the right side of the retrieved data block, as shown in FIG. 5E.

As apparent from the above description, the present invention provides a method for disconnecting forcedly text and photographic/graphic data portions from a compressed document image data upon extracting the data portions from the compressed document image data, for the acknowledgment of the document image data, thereby improving the accuracy in extracting each data portion and thus the reliability in the acknowledgement of the document.

What is claimed is:

1. A method for disconnecting character strings connected to a photographic/graphic data block from said photographic/graphic data block of a compressed image including a plurality of image blocks, comprising the steps of:
   (S1) scanning sequentially each of said image blocks of said compressed image to determine whether or not each image block is a photographic/graphic block;
   (S2) retrieving a left side, and then a right side of said image block examined as a photographic/graphic block in the step (S1) to detect to which side of said image block at least one character string thereof is connected, while also obtaining a character string position information; and
   (S3) disconnecting said at least one character string connected to said image block, and resetting an X-coordinate and a Y-coordinate of each said character string and of said photographic/graphic block;
   wherein the step (S2) comprises the sub-steps of:
   (S2a) retrieving said left side of said image block while obtaining a character string information for said image block, comprising the further sub-steps of:
   (S2a-1) examining said image block from left to right and from top to bottom, pixel by pixel, while counting only white pixels (TP) being scanned, until a contour pixel not corresponding to a starting point of each pixel line of said image block is first detected;
   (S2a-2) updating a maximum value of an X-coordinate of a first detected contour pixel and setting said maximum value for a character string width (WX);
   (S2a-3) determining whether a pixel line being scanned is a space pixel line, and then whether said space pixel line is a first space pixel line, and setting a present value of a Y-coordinate for an end Y-coordinate value of a present character string, if said pixel line is said space pixel line;
   (S2a-4) setting a present value of a Y-coordinate for a start Y-coordinate value of said present character string when said pixel line being scanned is identified as a character pixel line in the step (S2a-3) after a predetermined number of said pixel lines are scanned;
   (S2a-5) determining whether said pixel line being scanned is a last pixel line, and scanning a next pixel line if said pixel line is not the last pixel line; and
   (S2a-6) determining whether said image block has at least one character string connected to, on said left side, in accordance with a number of said character strings detected.

2. A method in accordance with claim 1, the step of detecting the start y-coordinate and the end y-coordinate comprises the steps of:
   if the currently scanned pixel line has been discriminated as containing said at least one character string and designated as a text data portion, discriminating whether a number (el) of space portions (EL) which has been detected is more than a predetermined critical value, discriminating the number of space portions as a continuous text data portion (TL) when the number (el) is no more than the critical value, while discriminating it as a new text data portion (TL) when the number (el) is more than the critical value, and further, if the number (el) of the detected space portions (EL) is no more than the predetermined critical value, accumulating a number (t1) of pixel lines representative of the text data portion (TL), initializing the accumulated value of the number (el) of the space portions (EL) and setting the current y-coordinate for the start y-coordinate; and
   if the currently scanned pixel line has been discriminated as the space portion (EL), accumulating the number (el) of space portions (EL), and setting the start y-coordinate of the first white pixel line detected as the space portion (EL) for the end y-coordinate of the current text data portion.

3. The method of claim 1, the step (S2) further comprising the sub-steps of:
   (S2b) retrieving said right side of said image block scanned as a photographic/graphic data block in the step (S1), while obtaining a character string position information for said image data block, comprising the further sub-steps of:
   (S2b-1) examining said image block from right to left and from top to bottom, pixel by pixel, while counting only white pixels (TP) being scanned, until contour pixel not corresponding to a starting point of each pixel line of said image block is first detected;
   (S2b-2) updating a maximum value of an X-coordinate of a first detected contour pixel and setting said maximum value for a character string width (WX);
   (S2b-3) determining whether a pixel line being scanned is a space pixel line, and then whether said space pixel is a first space pixel line, if said pixel line is said space pixel line, to set a present value of a Y-coordinate for an end Y-coordinate value of a present character string;
   (S2b-4) setting a present value of Y-coordinate for a start Y-coordinate value of said present character string when said pixel line being scanned is identified as character pixel line in the step (S2a-3) after a predetermined number of said pixel lines is scanned;
   (S2b-5) determining whether said pixel line being scanned is a last pixel line, and scanning a next pixel line if said pixel line is not the last pixel line; and
   (S2-6) determining whether or not said image block is connected to at least one character string on said right side, in accordance with a number of said character string detected; and
   (S2c) determining whether said photographic/graphic block is connected at least to one character string only on either left or right side.

* * * * *